United States Patent
Li et al.

(10) Patent No.: US 12,137,275 B2
(45) Date of Patent: Nov. 5, 2024

(54) CONTROL DISPLAY METHOD AND APPARATUS, DEVICE, AND STORAGE MEDIUM

(71) Applicant: BEIJING ZITIAO NETWORK TECHNOLOGY CO., LTD., Beijing (CN)

(72) Inventors: Hui Li, Beijing (CN); Yanhui Zhang, Beijing (CN); Zifeng Zhao, Beijing (CN); Wenlong Chen, Beijing (CN); Yuhan Li, Beijing (CN); Ting Yang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/489,236

(22) Filed: Oct. 18, 2023

(65) Prior Publication Data
US 2024/0048815 A1   Feb. 8, 2024

Related U.S. Application Data

(63) Continuation of application No. PCT/CN2022/098365, filed on Jun. 13, 2022.

(30) Foreign Application Priority Data

Jun. 23, 2021 (CN) .......................... 202110699317.9

(51) Int. Cl.
H04N 21/4788 (2011.01)
H04N 21/482 (2011.01)

(52) U.S. Cl.
CPC ....... *H04N 21/4788* (2013.01); *H04N 21/482* (2013.01)

(58) Field of Classification Search
CPC ............. H04N 21/4788; H04N 21/482; H04N 21/4532; H04N 21/25891; H04N 21/84;
(Continued)

(56) References Cited

U.S. PATENT DOCUMENTS

2007/0078732 A1* 4/2007 Crolley ................. G06Q 30/02
705/26.1
2007/0226374 A1 9/2007 Grell et al.
(Continued)

FOREIGN PATENT DOCUMENTS

CN   110333802 A   10/2019
CN   110442790 A   11/2019
(Continued)

OTHER PUBLICATIONS

International Search Report (with English translation) and Written Opinion issued in PCT/CN2022/098365, dated Aug. 17, 2022, 13 pages provided.

*Primary Examiner* — Cynthia M Fogg
(74) *Attorney, Agent, or Firm* — Fish & Richardson P.C.

(57) ABSTRACT

A control display method and apparatus, a device, and a storage medium are provided. The method includes: first, upon receipt of a preset comment behavior of a current user with respect to a target video, determining whether the current user has added a display object corresponding to the target video to favorites, the preset comment behavior being used for representing interest of the current user in the display object; and if it is determined that the current user has not added the display object to favorites, displaying on a comments panel corresponding to the target video a favorites control corresponding to the display object, so as to add the display object to favorites.

14 Claims, 6 Drawing Sheets

(58) Field of Classification Search
CPC ............. H04N 21/472; H04N 21/4622; H04N 21/4755; H04N 21/8133
USPC .......................................................... 725/37
See application file for complete search history.

(56) References Cited

U.S. PATENT DOCUMENTS

| | | | | |
|---|---|---|---|---|
| 2009/0182622 | A1* | 7/2009 | Agarwal | G06Q 30/0201 |
| | | | | 705/7.29 |
| 2010/0313113 | A1* | 12/2010 | Chen | G06F 16/70 |
| | | | | 715/205 |
| 2012/0188243 | A1* | 7/2012 | Fujii | G06F 3/0488 |
| | | | | 345/426 |
| 2014/0195610 | A1* | 7/2014 | Ken-Dror | G06Q 30/0269 |
| | | | | 709/204 |
| 2015/0261844 | A1 | 9/2015 | Ramalho | |
| 2016/0321302 | A1* | 11/2016 | Flynn | H04W 4/025 |
| 2017/0018139 | A1* | 1/2017 | Skoler | G07F 17/3255 |
| 2018/0041458 | A1* | 2/2018 | Hawkins | G06Q 10/10 |
| 2019/0132275 | A1* | 5/2019 | Kelly | H04L 65/611 |
| 2019/0138163 | A1* | 5/2019 | Howland | G06F 3/0482 |

FOREIGN PATENT DOCUMENTS

| | | |
|---|---|---|
| CN | 306722228 S | 7/2021 |
| CN | 306722229 S | 7/2021 |
| CN | 113423019 A | 9/2021 |
| CN | 307107953 S | 2/2022 |

\* cited by examiner

CONTROL DISPLAY METHOD AND APPARATUS, DEVICE, AND STORAGE MEDIUM

This application is a continuation of International Application No. PCT/CN2022/098365, filed on Jun. 13, 2022 which claims priority to Chinese Patent Application No. 202110699317.9, titled "CONTROL DISPLAY METHOD AND APPARATUS, DEVICE, AND STORAGE MEDIUM", filed on Jun. 23, 2021 with the China National Intellectual Property Administration, both of which are incorporated herein by reference in their entireties.

FIELD

The present disclosure relates to the technical field of data processing and in particular to a control display method and apparatus, a device and a storage medium.

BACKGROUND

With the growing abundance of Internet information, people can receive recommendations for things of interest through various channels. For example, when they watch a short video in a life services channel, they may long for the foods or scenic spots in the short video. People often add the Point of Interest (POI) in the short video to a favorite list for getting the food or visiting the spots later.

At present, a display object in the short video may be added to the favorites by triggering a favorites control configured on a detail page of the display object in the short video. However, with this method, the user favorites rate of presentation object is difficult to be increased.

SUMMARY

In order to solve or at least partially solve the above technical problems, an embodiment of the present disclosure provides a control display method. A favorites control is displayed on a comment panel of a target video to guide the user to add the presentation object in the target video to the favorites, so as to increase the user favorite rate of the presentation object in the target video.

In one embodiment, a control display method is provided according to the present disclosure. The method includes:
  determining whether a current user has added a presentation object corresponding to a target video to a favorite list, in response to a preset comment behavior of the current user to the target video; where the preset comment behavior is configured to indicate that the current user is interested in the presentation object; and
  displaying a favorites control for the presentation object on a comment panel corresponding to the target video, in response to determining that the current user has not added the presentation object to the favorite list, where the favorites control is configured to add the presentation object to the favorite list.

In a further implementation, the preset comment behavior includes at least one of like giving behavior, comment replying behavior, and preset comment posting behavior; the preset comment posting behavior includes posting a comment with a behavior of notifying a friend or posting a comment with a preset keyword, where the preset keyword includes a keyword indicating an interest in the presentation object.

In a further implementation, the displaying a favorites control for the presentation object on a comment panel corresponding to the target video includes:
  displaying the comment panel corresponding to the target video, wherein the comment panel includes an anchor corresponding to the presentation object; and
  switching the anchor on the comment panel to the favorites control for the presentation object.

In a further implementation, after switching the anchor on the comment panel to the favorites control for the presentation object, the method further includes: presenting a preset glowing animation effect for the favorites control.

In a further implementation, after the displaying a favorites control for the presentation object on a comment panel corresponding to the target video, the method further includes: adding the presentation object for the current user to the favorite list, in response to a triggering operation on the favorites control.

In a further implementation, the method includes: closing the comment panel and re-displaying the comment panel; and switching a state of the favorites control on the re-displayed comment panel to a hidden state.

In another embodiment, a control display apparatus is further provided according to the present disclosure, the apparatus includes:
  a determination module configured to determine whether a current user has added a presentation object corresponding to a target video to a favorite list, in response to a preset comment behavior of the current user to the target video, where the preset comment behavior is configured to indicate that the current user is interested in the presentation object; and
  a display module configured to display a favorites control for the presentation object on a comment panel corresponding to the target video, in response to determining that the current user has not added the presentation object to the favorite list, wherein the favorites control is configured to add the presentation object to the favorite list.

In another embodiment, a computer readable storage medium is provided according to the present disclosure. The computer readable storage medium stores instructions. The instructions, when running on a terminal device, cause the terminal device to implement the control display method above.

In another embodiment, a device is provided according to the present disclosure, the device includes: a memory; a processor; and a computer program, stored on the memory and executable on the processor; when executing the computer program, the processor implements the above control display method.

In another embodiment, a computer program product is provided according to the present disclosure. The computer program product comprises computer programs/instructions, the computer programs/instructions, when executed by a processor, cause the processor to implement the above control display method.

BRIEF DESCRIPTION OF THE DRAWINGS

The drawings herein are incorporated into the specification and constitute a part of the specification, which show embodiments which comply with the present disclosure. The drawings and the specification are used as a whole to explain the principle of the present disclosure.

In order to more clearly illustrate the embodiments of the present disclosure or the technical solutions in the conventional technology, the drawings used in the description of the embodiments or the conventional technology are briefly introduced below. It is apparent that, for those skilled in the art, other drawings can be obtained according to the provided drawings without any creative effort.

DETAILED DESCRIPTION OF EMBODIMENTS

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

At present, a presentation object in the short video is added to a favorite list by triggering the favorites control configured on the detail page of the presentation object in the short video. In other words, the user must enter into the detail page of the presentation object in the short video in order to add the presentation object in the short video to the favorite list. The user cannot easily add the presentation object to the favorite list, by setting such a single entrance for triggering the addition of the presentation object to the favorite list, which is difficult to increase the user favorites rate of presentation object.

In order to actively guide the user to add the presentation objects in the target video to the favorite list and increase the user favorites rate of presentation object in the target video, a control display method is provided according to an embodiment of the present disclosure. First, in response to receiving a preset comment behavior of a current user to a target video, it is determined whether the current user has added a presentation object corresponding to the target video to the favorite list. The preset comment behavior is used to indicate that current user is interested in the presentation object. Then, in response to determining that the current user has not added the presentation object to the favorite list, a favorites control for the presentation object is displayed on a comment panel corresponding to the target video, the favorites control is used to add the presentation object to the favorite list. In the embodiment of the present disclosure, the favorites control for the presentation object can be displayed on the comment panel when it is determined that the current user is interested in the presentation object in the target video, to guide the user to added the presentation object to the favorite list and improve the user favorites rate of the presentation object in the target video. In addition, the favorites control displayed on the comment panel can facilitate the user to add the presentation object to the favorite list, which improves the user experience.

Figure 1:
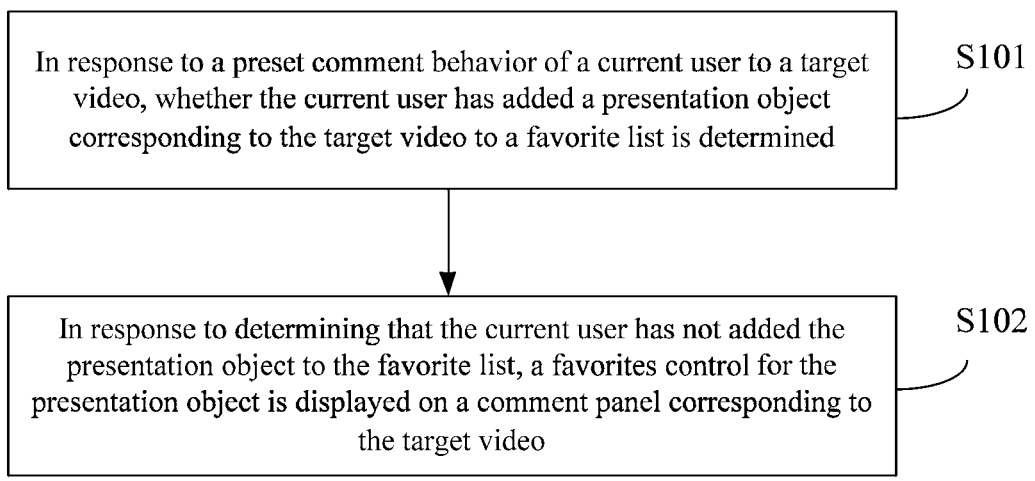
FIG. 1 is a flowchart of a control display method according to an embodiment of the present disclosure.

Based on this, a control display method a control is provided according to an embodiment of the present disclosure. Referring to FIG. 1, FIG. 1 is a flowchart of a control display method according to an embodiment of the present disclosure. The method includes steps S101 and S102.

In S101, in response to a preset comment behavior of a current user to a target video, whether the current user has added a presentation object corresponding to the target video to favorite list is determined.

The preset comment behavior is used to indicate that the current user is interested in the presentation object.

In an embodiment of the present disclosure, the presentation object corresponding to the target video may include Points of Interest (POIs), props, music, items and the like presented in the target video. POI may be a house, a store, a mailbox, or a bus stop in a geographic information system. For example, the target video may be a video in a recommended scenic spot video streaming, or a video in a recommended food video streaming. The target video may be a video with the POI. The POI presented in the target video may include four aspects of information on the recommended things (such as scenic spot, food, etc.) in the target video. The specific four aspects of information include name information, type information, and coordinate information, classification information.

In an embodiment of the present disclosure, the preset comment behavior of the current user to the target video indicates that the current user in the presentation object is interested in the target video. For example, the current user is interested in the POI corresponding to the target video, the music in the target video, or the presented item in the target video.

In an implementation, the preset comment behavior includes at least one behavior of like giving behavior, comment replying behavior, and preset comment posting behavior.

For example, the like giving behavior and comment replying behavior may include the like giving behavior and comment replying behavior to hot comments of the target video. The hot comment usually is a comment which has a large number of likes or a large number of replies and can indicate the interest in the presentation object in the target video. The hot comment is generally on the top of the comment panel. For example, the hot comment may be a comment about introduction information of the presentation object in the target video posted by the poster of the target video. By liking or replying to the above comment, the interest of the current user in the presentation object may be indicated. The hot comment may also be a comment posted by the other user that can indicate interest in the presentation object, such as, the comment posted by the other user about the experience of no longer longing for the POI presented in the target video. By liking or replying to the above comment, the interest of the current user in the presentation object may be indicated.

The preset comment posting behavior includes: posting a comment with a behavior of notifying a friend or posting a comment with a preset keyword. The preset keyword includes a keyword indicating an interest in the presentation object.

For example, the posting the comment with the behavior of notifying the friend may be: posting a comment by the current user on the comment panel of the target video, in which a friend is notified (i.e., @friend). This comment is on the top of the comment panel corresponding to the current user. The posting the comment with the preset keyword may be: the current user posting a comment with words such as "want to go", "like", "want to eat" on the comment panel of the target video.

It should be noted that the specific words of the preset keywords indicating the interest in the presentation object in the target video is not limited in this embodiment, which may be the words such as "want to go", "like", "want to eat".

In practical applications, before the current user makes the preset comment behavior to the target video, the comment panel corresponding to the target video is displayed first. The comment panel can be displayed, for example, by triggering a preset display control of the comment panel by the current user, such as, clicking the "Comment" control on the target video play page. The behaviors of viewing comments, posting comments, liking comments may be performed on the comment panel.

In an embodiment of the present disclosure, when the preset comment behavior of the current user to the target video is received, it is determined whether the current user has added the presentation object corresponding to the target video to the favorite list. In fact, when any one of the above-mentioned preset comment behaviors of the current user to the target video is received, it may indicate that the current user is interested in the presentation object of the target video. Then, it is determined whether the current user has added the presentation object corresponding to the target video to the favorite list, to further determine whether to display the favorites control on the comment panel. For example, the target video is a video with a target POI of a recommended scenic spot. When a comment with @friend posted by the current user on the comment panel of the target video is received, it is determined whether the current user has added the target POI corresponding to the target video to the favorite list.

In an implementation, whether the current user has added the presentation object corresponding to the target video to the favorite list may be determined by querying whether the presentation object corresponding to the target video is included in a favorite list of the current user. For example, it may be determined by querying whether a target POI corresponding to the target video is included in a favorite POI list of the current user; by querying whether a presented music corresponding to the target video is included in a favorite music list of the current user; or by querying whether a presented item corresponding to the target video is included in a favorite item list of the current user. Once it is found that the target POI corresponding to the target video is in the favorite POI list of the current user, it may be determined that the current user has added the target POI corresponding to the target video to the favorite list; otherwise, it indicates that the current user has not added the target POI corresponding to the target video to the favorite list yet.

In S102, in response to determining that the current user has not added the presentation object to the favorite list, a favorites control for the presentation object is displayed on a comment panel corresponding to the target video.

The favorites control is used to add the presentation object to the favorite list.

Figure 2:
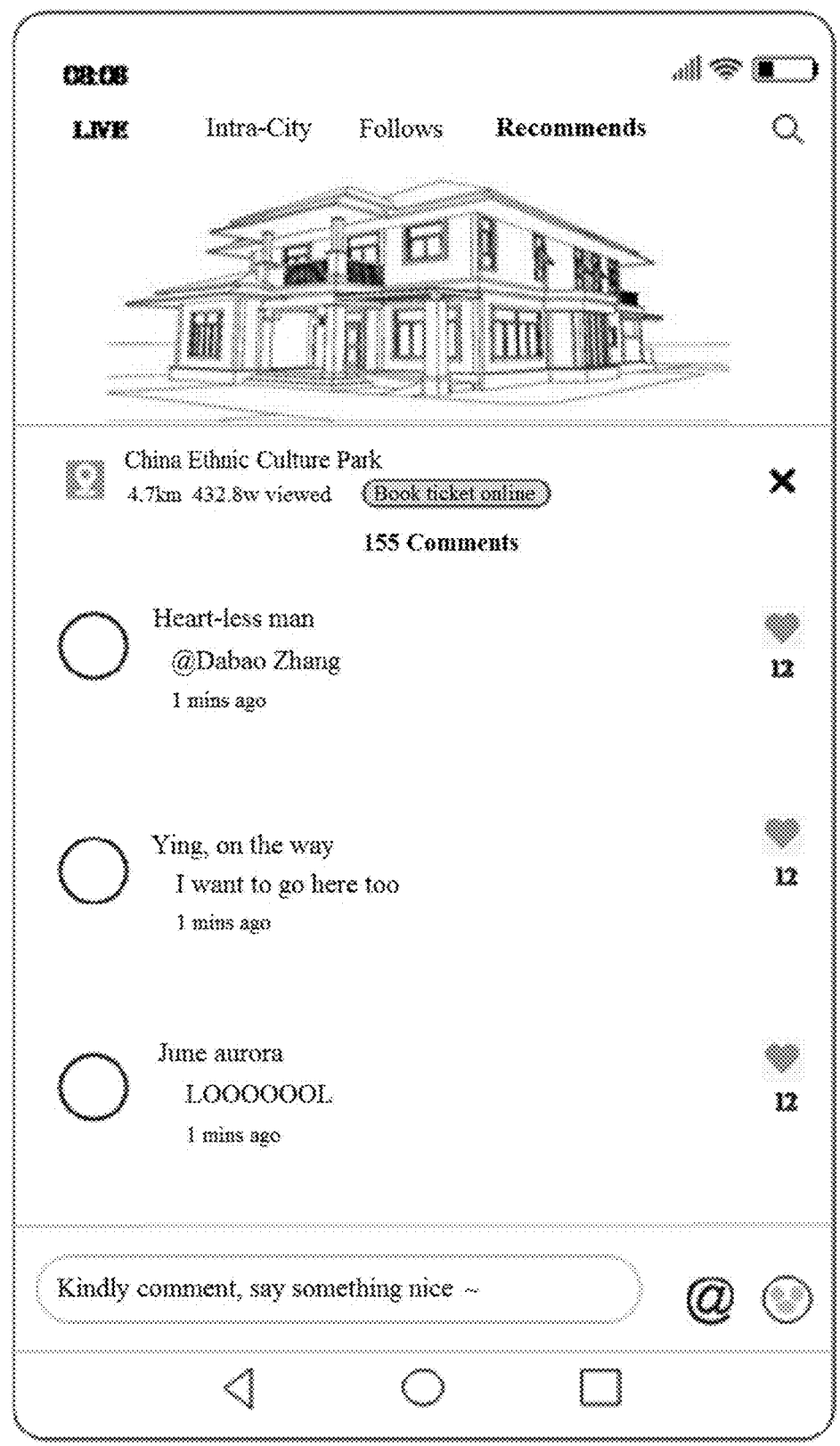
FIG. 2 is a schematic diagram of a comment panel of a target video according to an embodiment of the present disclosure.

In practical applications, the comment panel corresponding to the target video is provided with an anchor of the presentation object. The details page of the presentation object may be entered by clicking the anchor of the presentation object. For example, a POI anchor is set on a comment panel corresponding to the video with a POI. A details page of a target POI may be entered by clicking on the POI anchor. As shown in FIG. 2, FIG. 2 is a schematic diagram of a comment panel of a target video according to an embodiment of the present disclosure. The POI anchor is set to the top of the comment panel. In addition, a POI name control may further be set on the comment panel. The details page of the target POI may be entered by clicking on the POI anchor or the POI name control.

In the embodiment of the present disclosure, when the preset comment behavior of the current user to the target video is received, it is determined whether the current user has added the presentation object corresponding to the target video to the favorite list. Once it is determined that the current user has not added the presentation object to the favorite list, both of the anchor corresponding to the presentation object and a favorites control for the presentation object may be displayed on the comment panel of the target video, to add the presentation object to the favorite list.

Taking the presentation object as the target POI corresponding to the target video as an example, when the preset comment behavior of the current user to the target video is received, whether the current user has added the target POI corresponding to the target video to the favorite list is determined. Once it is determined that the current user has not added the target POI to the favorite list, both of the POI anchor corresponding to the target POI and the favorites control for the target POI may be displayed on the comment panel of the target video, to add the target POI to the favorite list. In other words, on the comment panel of the target video, the user can directly click the favorites control to trigger the action of adding the target POI to the favorite list, rather than entering the detail page of the target POI and adding the target POI to the favorite list, which improves the user experience.

Figure 3:
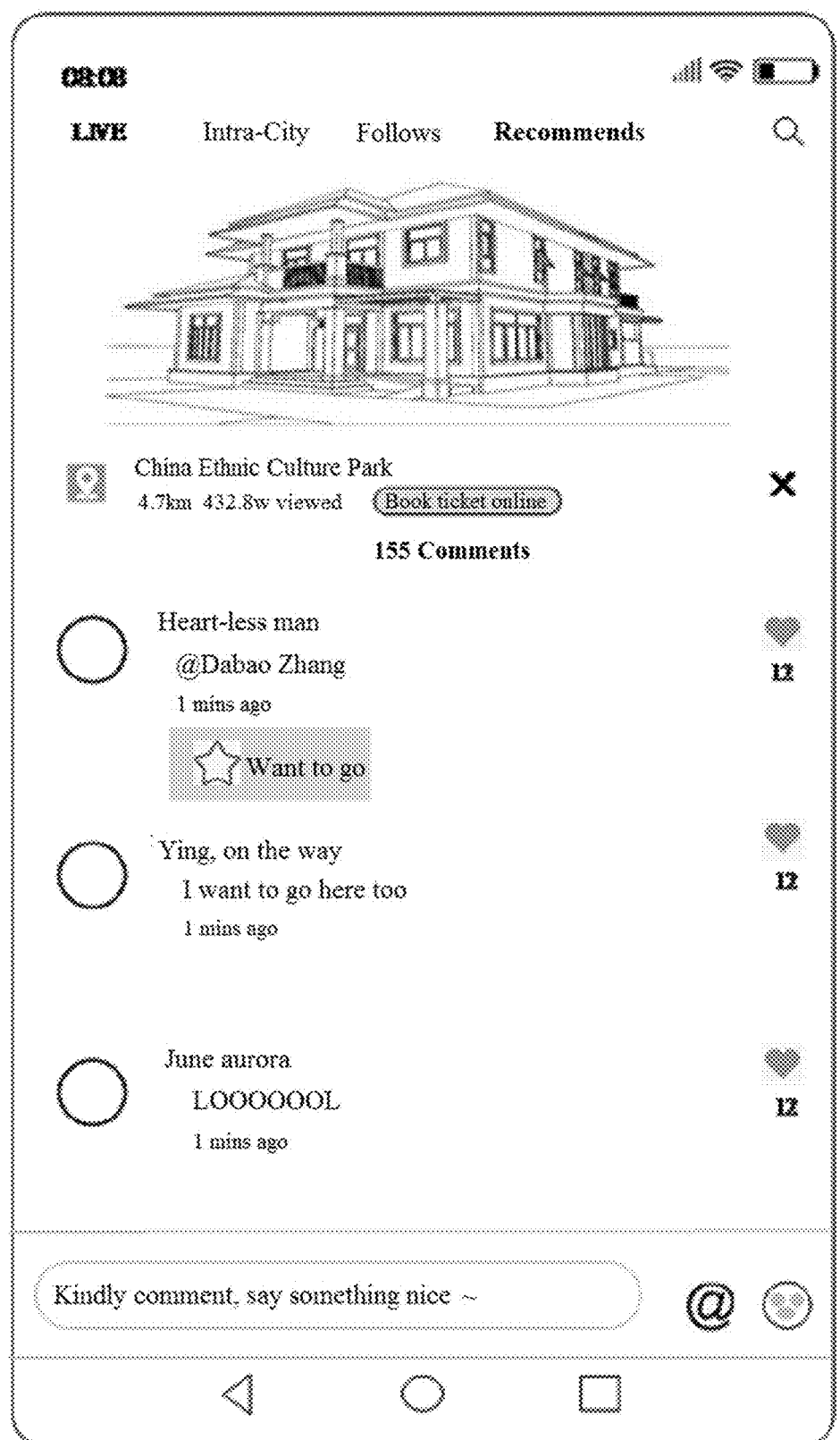
FIG. 3 is a schematic diagram of a comment panel of a target video according to another embodiment of the present disclosure.

In an implementation, when the preset comment behavior of the current user to the target video is received and it is determined that the current user has not added the target POI to the favorite list, the favorites control for the target POI may be displayed on the comment panel corresponding to the target video. In order to more effectively guide the user to add the interested POI to the favorite list, the favorites control for the target POI may be displayed on the comment panel at a position close to the preset comment posted by the user. For example, as shown in FIG. 3, FIG. 3 is a schematic diagram of a comment panel of a target video according to another embodiment of the present disclosure. In FIG. 3, the favorites control for the target POI is displayed under the comment with @friend behavior posted by the current user, which is convenient for directly guiding the users to add the interested POIs to the favorite list. In addition, the favorites control may also be displayed under the comment corresponding to the like giving behavior triggered by the current user; or may be displayed under the comment corresponding to the comment replying behavior triggered by the current user.

Figure 4:
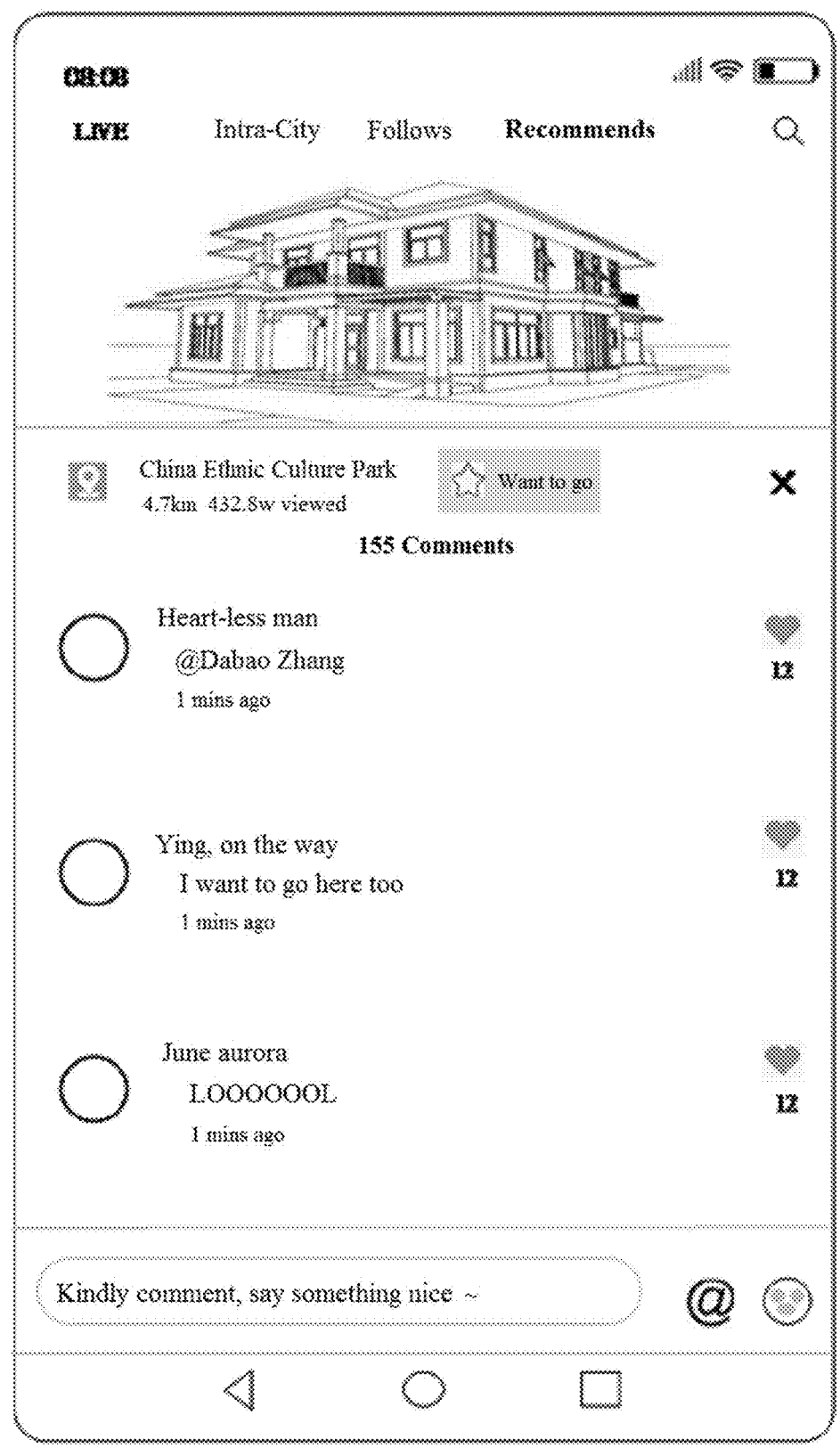
FIG. 4 is a schematic diagram of a comment panel of a target video according to another embodiment of the present disclosure.

In another implementation, in order to effectively guide the user to add the interested POI to the favorite list, the favorites control for the target POI may be displayed on the comment panel at a position close to the target POI. For example, as shown in FIG. 4, FIG. 4 is a schematic diagram of a comment panel of a target video according to another embodiment of the present disclosure. In FIG. 4, the favorites control for the target POI is provided beside the POI name control on the comment panel. In this way, after the preset comment behavior of the current user to the target video is received, it is convenient to guide the current user to add the interested POI to the favorite list.

It should be noted that the favorites control for the presentation object in the target video may be a control with words such as "Want to go", "favorites", "likes", etc. The favorites control for the presentation object in the target video may be displayed at the lower right corner of the comment panel corresponding to the target video. The specific style and specific position of the favorites control for the presentation object in the target video are not limited in this embodiment.

In addition, in the embodiment of the present disclosure, when the preset comment behavior of the current user to the target video is received, it is determined whether the current user has added the presentation object corresponding to the target video to the favorites list. Once it is determined that the current user has added the presentation object to the favorite list, no favorites control for the presentation object is displayed on the comment panel of the target video.

In an implementation, when a triggering operation on a preset display control of the comment panel corresponding to the target video is received, the comment panel corresponding to the target video is displayed, and an anchor corresponding to the presentation object is displayed on the comment panel. Taking the presentation object being the POI displayed in the target video as an example, the anchor of the target POI is displayed on the comment panel. When the preset comment behavior of the current user to the target video is received and it is determined that the current user has not added the target POI to the favorite list, the anchor of the target POI (referring to FIG. 2) on the comment panel is switched to the favorites control for the target POI.

In an embodiment of the present disclosure, there may be multiple approaches for switching the anchor of the target POI on the comment panel to the favorites control for the target POI. As an example, the anchor of the target POI slides down to disappear, while the favorites control for the target POI slides up to appear. Alternatively, the anchor of the target POI slides right to disappear, while the favorites control for the target POI slides left to appear.

Figure 5:
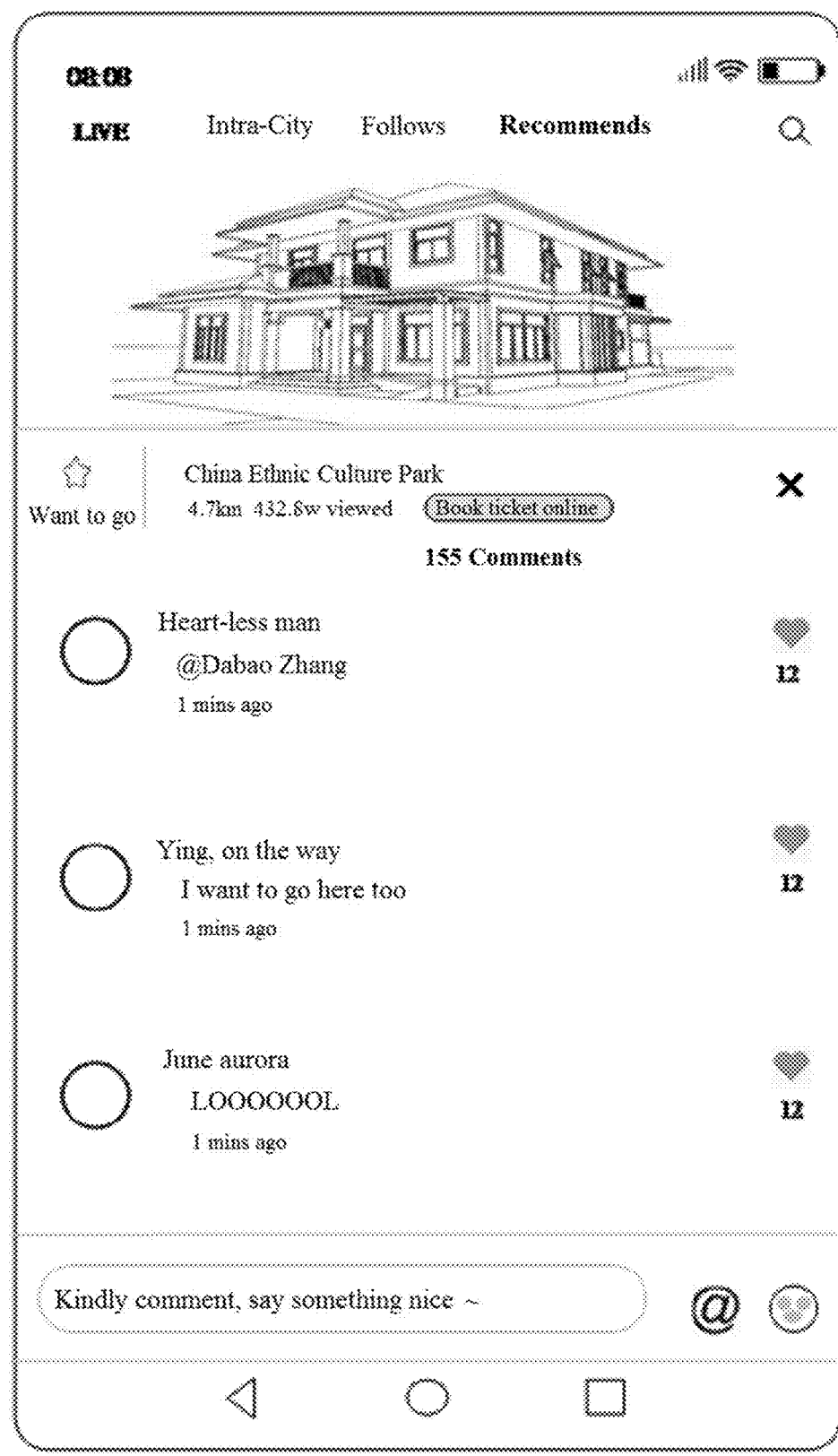
FIG. 5 is a schematic diagram of a comment panel of a target video according to another embodiment of the present disclosure.

After the anchor of the target POI on the comment panel is switched to the favorites control for the target POI, both of the POI name control and the favorites control for the target POI may be displayed on the comment panel corresponding to the target video. The user can click on the favorites control directly, to trigger the action of adding the target POI to the favorite list. As shown in FIG. 5, FIG. 5 is a schematic diagram of a comment panel of a target video according to another embodiment of the present disclosure. In FIG. 5, the favorites control for the target POI is provided on the left side of the POI name control, and the user can click on the favorites control to add the target POI to the favorite list.

In order to guide users to perform a triggering operation on the favorites control, a dynamic effect may be displayed for the favorites control, to guide the user to click the favorites control and add the target POI to the favorite list.

In an implementation, after the anchor corresponding to the presentation object on the comment panel is switched to the favorites control for the presentation object, a preset glowing animation effect is displayed for the favorites control. In the preset glowing animation effect, the favorites control may flicker at a preset time interval to guide the user to add the presentation object in the target video to the favorite list. For example, after the anchor corresponding to the target POI on the comment panel is switched to the favorites control for the target POI, the favorites control flickers once per second for a total of three flickers.

It should be noted that the favorites control may flicker once every 1 second, or once every 2 seconds, which may flicker three times or four times in total. The preset glowing animation effect of the favorites control is not specifically limited in this embodiment.

In an implementation, after the favorites control for the presentation object is displayed on the comment panel corresponding to the target video, the presentation object is added to the favorite list for the current user in response to a triggering operation on the favorites control.

In an embodiment of the present disclosure, taking the presentation object being the POI displayed in the target video as an example, when the triggering operation on the favorites control is received, the target POI is added to the favorite list for the current user, to complete the operation of adding the interested POI to the favorite list by the current user. In this way, the users can find out the interested POIs in the POI favorites list subsequently.

In an implementation, after the current user closes the comment panel corresponding to the target video, when a triggering operation on the preset display control of the comment panel corresponding to the target video is received again, the comment panel corresponding to the target video is displayed. In this case, the state of the favorites control on the comment panel is switched to a hidden state. That is, the comment panel as shown in FIG. 2 is directly displayed, in which the favorites control for the target POI is not displayed on the comment panel at this time.

In the control display method according to the embodiments of the present disclosure, first, in response to receiving a preset comment behavior of a current user to a target video, it is determined whether the current user has added a presentation object corresponding to the target video to the favorite list. The preset comment behavior is used to indicate that the current user is interested in the presentation object. Then, in response to determining that the current user has not added the presentation object to the favorite list, a favorites control for the presentation object is displayed on a comment panel corresponding to the target video. The favorites control is used to add the presentation object to the favorite list. With the control display method according to the embodiments of the present disclosure, the favorites control for the presentation object may be displayed on the comment panel when it is determined that the current user is interested in the presentation object in the target video, to guide the user to add the presentation object to the favorite list and improve the user favorites rate of the presentation object in the target video. In addition, the favorites control displayed on the comment panel can facilitate the user to add the presentation object to the favorite list, which improves the user experience.

Figure 6:
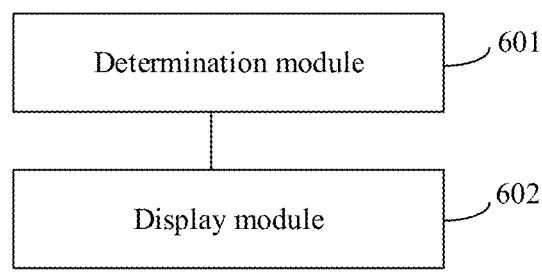
FIG. 6 is a schematic structural diagram of a control display apparatus according to an embodiment of the present disclosure.

Based on the above method embodiment, a control display apparatus is further provided according to an embodiment of the present disclosure. Referring to FIG. 6, FIG. 6 is a schematic structural diagram of a control display apparatus according to an embodiment of the present disclosure. The control display apparatus includes a determination module 601 and a display module 602.

The determination module 601 is configured to determine whether a current user has added a presentation object corresponding to a target video to favorite list, in response to a preset comment behavior of the current user to the target video, where the preset comment behavior is configured to indicate that the current user is interested in the presentation object.

The display module 602 is configured to display a favorites control for the presentation object on a comment panel corresponding to the target video, in response to determining that the current user has not added the presentation object to the favorite list, where the favorites control is configured to add the presentation object to the favorite list.

In an implementation, the preset comment behavior includes at least one of like giving behavior, comment replying behavior, and preset comment posting behavior; the preset comment posting behavior includes posting a comment with a behavior of notifying a friend or posting a comment with a preset keyword, where the preset keyword includes a keyword indicating an interest in the presentation object.

In an implementation, the display module 602 includes: a display submodule and a switching submodule.

The display submodule is configured to display the comment panel corresponding to the target video, where the comment panel includes an anchor corresponding to the presentation object.

The switching submodule is configured to switch the anchor on the comment panel to the favorites control for the presentation object.

In an embodiment, the apparatus further includes: a presenting module configured to present a preset glowing animation effect for the favorites control.

In an embodiment, the apparatus further includes: a favorite module configured to add the presentation object for the current user to the favorite list in response to a triggering operation on the favorites control.

In an embodiment, the apparatus further includes: a hiding module configured to close the comment panel and re-display the comment panel; and switch a state of the favorites control on the re-displayed comment panel to a hidden state.

In the control display apparatus provided by the embodiments of the present disclosure, first in response to receiving a preset comment behavior of a current user to a target video, it is determined whether the current user has added a presentation object corresponding to the target video to the favorite list. The preset comment behavior is used to indicate that the current user is interested in the presentation object. Then, in response to determining that the current user has not added the presentation object to the favorite list, a favorites control for the presentation object is displayed on a comment panel corresponding to the target video. The favorites control is used to add the presentation object to the favorite list. With the control display apparatus according to the embodiments of the present disclosure, the favorites control for the presentation object can be displayed on the comment panel when it is determined that the current user is interested in the presentation object in the target video, to guide the user to add the presentation object to the favorite list and improve the user favorites rate of the presentation object in the target video. In addition, the favorites control displayed on the comment panel can facilitate the user to add the presentation object to the favorite list, which improves the user experience.

In addition to the above method and apparatus, a computer readable storage medium is further provided according to an embodiment of the present disclosure. Instructions are stored on the computer readable storage medium. The instructions, when running on a terminal device, cause the terminal device to implement the control display method described in the embodiments of the present disclosure.

A computer program product is further provided according to an embodiment of the present disclosure. The computer program product includes computer programs/instructions. The computer programs/instructions, when executed by a processor, cause the processor to implement the control display method described in the embodiments of the present disclosure.

Figure 7:
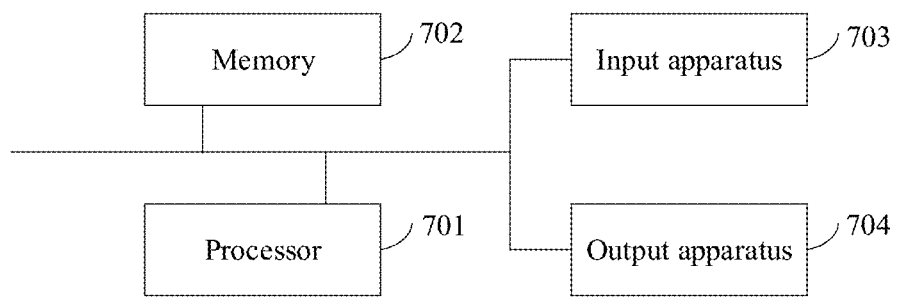
FIG. 7 is a schematic structural diagram of a control display device according to an embodiment of the present disclosure.

In addition, a control display device is further provided according to an embodiment of the present disclosure, as shown in FIG. 7. The device may include: a processor 701, a memory 702, an input apparatus 703 and an output apparatus 704. The number of processors 701 in the control display device may be one or more. As an example, one processor is taken as an example in FIG. 7. In some embodiments of the present disclosure, the processor 701, the memory 702, the input apparatus 703 and the output apparatus 704 may be connected through the bus or in other ways, where connections through the bus is taken as an example in FIG. 7.

The memory 702 may be used to store software programs and modules, and the processor 701 executes various functional applications and data processing of the device for control display by running the software programs and modules stored on the memory 702. The memory 702 may mainly include a program storage area and a data storage area, wherein the program storage area may store an operating system, an application program required by at least one function, and the like. In addition, the memory 702 may include a high-speed random access memory, and may also include a non-volatile memory, such as at least one magnetic disk storage device, flash memory device, or other volatile solid-state storage devices. The input apparatus 703 may be used to receive the inputted digital or character information, and generate signal input related to user setting and function control of the device for control display.

Specifically, in this embodiment, the processor 701 may load the executable files corresponding to the processes of one or more application programs into the memory 702 according to the following instructions, and the processor 701 may run the application programs stored on the memory 702, so as to realize various functions of the above device for control display.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of other identical elements in such process, method, article or device.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the scope of the present disclosure. Therefore, the present disclosure is not limited to the embodiments illustrated herein, rather, should be defined by the broadest scope consistent with the principle and novel features disclosed herein.

The invention claimed is:

1. A control display method, comprising:
    determining whether a current user has added a presentation object corresponding to a target video to a favorite list, in response to a preset comment behavior of the current user to the target video, wherein the preset comment behavior is configured to indicate that the current user is interested in the presentation object; and
    displaying a favorites control for the presentation object on a comment panel corresponding to the target video, in response to determining that the current user has not added the presentation object to the favorite list, wherein the favorites control is configured to add the presentation object to the favorite list,
    wherein the displaying the favorites control for the presentation object on the comment panel corresponding to the target video comprises:
        displaying the comment panel corresponding to the target video, wherein the comment panel comprises an anchor element corresponding to the presentation object; and
        switching the anchor element on the comment panel to the favorites control for the presentation object, and
        after switching the anchor element on the comment panel to the favorites control for the presentation object, the method further comprises:
        presenting a preset glowing animation effect for the favorites control.

2. The method according to claim 1, wherein the preset comment behavior comprises one or more of like giving behavior, comment replying behavior, and preset comment posting behavior; the preset comment posting behavior comprises one or more of posting a comment with a behavior of notifying a friend and posting a comment with a preset keyword, and wherein the preset keyword comprises a keyword indicating an interest in the presentation object.

3. The method according to claim 1, wherein after the displaying the favorites control for the presentation object on the comment panel corresponding to the target video, the method further comprises:
    adding the presentation object to the favorite list for the current user, in response to a triggering operation on the favorites control.

4. The method according to claim 1, further comprising:
    closing the comment panel and re-displaying the comment panel; and switching a state of the favorites control on the re-displayed comment panel to a hidden state.

5. The method according to claim 1, wherein the comment panel includes a list of comments by users different from the current user.

6. A non-transitory computer readable storage medium, wherein the non-transitory computer readable storage medium stores instructions, and the instructions, when running on a terminal device, cause the terminal device to:
    determine whether a current user has added a presentation object corresponding to a target video to a favorite list, in response to a preset comment behavior of the current user to the target video, wherein the preset comment behavior is configured to indicate that the current user is interested in the presentation object; and
    display a favorites control for the presentation object on a comment panel corresponding to the target video, in response to determining that the current user has not added the presentation object to the favorite list, wherein the favorites control is configured to add the presentation object to the favorite list;
    display the comment panel corresponding to the target video, wherein the comment panel comprises an anchor element corresponding to the presentation object;
    switch the anchor element on the comment panel to the favorites control for the presentation object; and
    present a preset glowing animation effect for the favorites control, after the anchor element on the comment panel is switched to the favorites control for the presentation object.

7. The non-transitory computer readable storage medium according to claim 6, wherein the preset comment behavior comprises one or more of like giving behavior, comment replying behavior, and preset comment posting behavior; the preset comment posting behavior comprises one or more of posting a comment with a behavior of notifying a friend and posting a comment with a preset keyword, and wherein the preset keyword comprises a keyword indicating an interest in the presentation object.

8. The non-transitory computer readable storage medium according to claim 6, wherein the instructions, when running on the terminal device, cause the terminal device to:
    add the presentation object to the favorite list for the current user in response to a triggering operation on the favorites control, after the favorites control for the presentation object is displayed on the comment panel corresponding to the target video.

9. The non-transitory computer readable storage medium according to claim 6, wherein the instructions, when running on the terminal device, cause the terminal device to:
    close the comment panel and re-display the comment panel; and
    switch a state of the favorites control on the re-displayed comment panel to a hidden state.

10. The method according to claim 2, wherein the comment panel includes a list of comments by users different from the current user, and the like giving behavior is liking one of the comments by the users different from the current user.

11. A device, comprising:
    a memory;
    a processor; and
    a computer program, stored on the memory and executable by the processor;
    wherein the computer program, when executed by the processor, causes the processor to:
        determine whether a current user has added a presentation object corresponding to a target video to a favorite list, in response to a preset comment behavior of the current user to the target video, wherein the preset comment behavior is configured to indicate that the current user is interested in the presentation object; and
        display a favorites control for the presentation object on a comment panel corresponding to the target video, in response to determining that the current user has not added the presentation object to the favorite list, wherein the favorites control is configured to add the presentation object to the favorite list;

display the comment panel corresponding to the target video, wherein the comment panel comprises an anchor element corresponding to the presentation object;

switch the anchor element on the comment panel to the favorites control for the presentation object; and present a preset glowing animation effect for the favorites control, after the anchor element on the comment panel is switched to the favorites control for the presentation object.

12. The device according to claim 11, wherein the preset comment behavior comprises one or more of like giving behavior, comment replying behavior, and preset comment posting behavior; the preset comment posting behavior comprises one or more of posting a comment with a behavior of notifying a friend and posting a comment with a preset keyword, and wherein the preset keyword comprises a keyword indicating an interest in the presentation object.

13. The device according to claim 11, wherein the computer program, when executed by the processor, causes the processor to:

add the presentation object to the favorite list for the current user in response to a triggering operation on the favorites control, after the favorites control for the presentation object is displayed on the comment panel corresponding to the target video.

14. The device according to claim 11, wherein the computer program, when executed by the processor, causes the processor to:

close the comment panel and re-display the comment panel; and switch a state of the favorites control on the re-displayed comment panel to a hidden state.

* * * * *